J. Liming,
Hobby Horse.
No. 104,170.   Patented June 14. 1870.
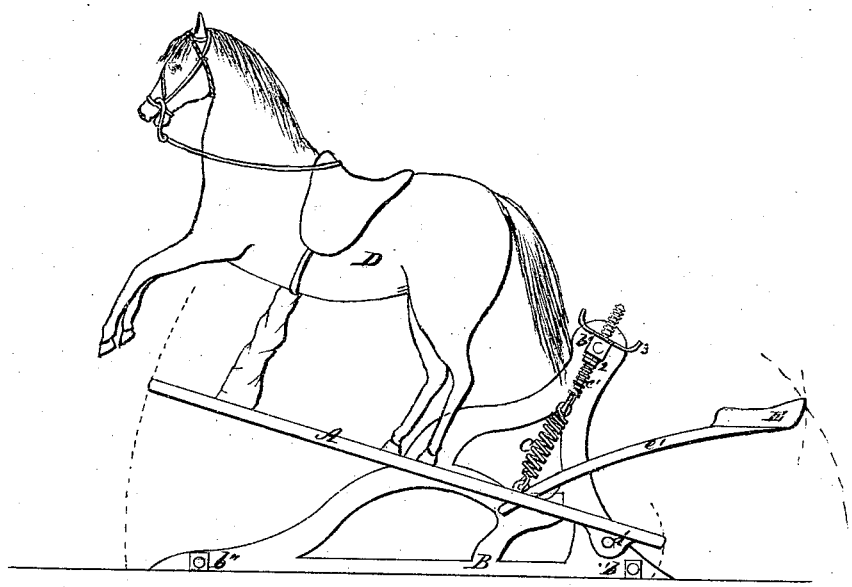
Witnesses:
Buy. Monison
Jno. H Scott Jr
Inventor:
John Liming

United States Patent Office.

JOHN LIMING, OF PHILADELPHIA, PENNSYLVANIA.

Letters Patent No. 104,170, dated June 14, 1870.

IMPROVEMENT IN HOBBY-HORSES.

The Schedule referred to in these Letters Patent and making part of the same

I, JOHN LIMING, of the city of Philadelphia, in the State of Pennsylvania, have invented certain Improvements in Hobby-Horses for children, of which the following is a specification.

Nature and Objects of the Invention.

My improvements relate to those hobby-horses for the amusement and exercise of children, in which the horse is supported upon a lever platform, the fulcrum of which is attached to the middle of two adjustable scroll-springs, below the platform, in such a manner that an up-and-down springing motion can be given to the horse at the pleasure of the rider.

My invention consists in the peculiar arrangement of a spiral spring and a rear seat in relation to the vibrating platform and the stationary frame, as hereinafter set forth, for the purpose of lessening the cost in springs for the purpose, and increasing the extent of the vibratory motions of the rear seat.

Description of the Accompanying Drawings.

A is the platform, attached, by its fulcrum, $a'$, to main-supporting frame B', and suspended from the upper transverse bar, $b'$, of the latter by means of the adjustable spiral spring C.

D the horse, and

E the spring seat in rear of the frame B.

General Description.

The frame B consists of two vertically placed cast-iron skeleton side frames, secured together by transverse bars $b''$ $b''$, the fulcrum bar $a'$ of the platform A turning on journals in the said side pieces of the frame B. The platform A, with the horse D attached, is suspended from the bar $b'$ by the spiral spring C, the upper end of which latter is adjustably attached to $b'$ by means of a screw-bar, $c'$, jam-nut, 2, and thumb and finger-nut, 3, so that any required degree of elevation and range of the forward end of the platform and, of consequence, the horse may be given with facility.

The rear seat E is fixed on the upper end of a springy stem, $e'$, the lower end of which is inserted in a suitable hole or socket in the rear part of the platform A, so as to afford an elevated springy seat in rear of the frame and horse.

It will be understood without further description that, if a child be mounted on the horse and another in the seat, by adjusting the tension of the spring C to suit, a see-saw motion can be easily kept up between them, and that the construction and application of the spiral spring C will be less costly, and, at the same time, afford a longer and easier motion than the scroll-springs heretofore used.

Claim.

The arrangement of the spiral spring C, platform A, and seat E, in relation to the frame B, substantially as and for the purposes hereinbefore set forth.

JOHN LIMING.

Witnesses:
    JNO. H. SCOTT, Jr.,
    BENJ. MORISON.